(12) United States Patent
Leon Ojeda et al.

(10) Patent No.: US 11,345,355 B2
(45) Date of Patent: May 31, 2022

(54) METHOD FOR DETERMINING A SPEED TO BE REACHED FOR A FIRST VEHICLE PRECEDED BY A SECOND VEHICLE, IN PARTICULAR FOR AN AUTONOMOUS VEHICLE

(71) Applicant: IFP Energies nouvelles, Rueil-Malmaison (FR)

(72) Inventors: Luis Leon Ojeda, Puteaux (FR); Jihun Han, Paris (FR); Antonio Sciarretta, Rueil-Malmaison (FR); Laurent Thibault, Lyons (FR); Giovanni De Nunzio, Oullins (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 162 days.

(21) Appl. No.: 16/123,239

(22) Filed: Sep. 6, 2018

(65) Prior Publication Data

US 2019/0071096 A1    Mar. 7, 2019

(30) Foreign Application Priority Data

Sep. 6, 2017    (FR) ..................... 17/58.212

(51) Int. Cl.
*B60W 40/105*    (2012.01)
*B60W 30/16*    (2020.01)
(Continued)

(52) U.S. Cl.
CPC ........ *B60W 40/105* (2013.01); *B60W 30/143* (2013.01); *B60W 30/16* (2013.01);
(Continued)

(58) Field of Classification Search
CPC .. B60W 40/105; B60W 30/16; B60W 30/143; B60W 40/04; B60W 30/162;
(Continued)

(56) References Cited

U.S. PATENT DOCUMENTS 5,487,479 A    1/1996 Pech et al.
9,286,737 B2    3/2016 Chasse et al.
(Continued)

FOREIGN PATENT DOCUMENTS

DE    10 2011 002275 A1    10/2012
EP    2 219 092 A1    8/2010
FR    2994923 A1    3/2014

OTHER PUBLICATIONS

Wikipedia, Equations of Motion, Aug. 29, 2015, p. 4-5 (Year: 2015).*

(Continued)

*Primary Examiner* — Aniss Chad
*Assistant Examiner* — Chase L Cooley
(74) *Attorney, Agent, or Firm* — Fitch, Even, Tabin & Flannery LLP

(57) ABSTRACT

The present invention is a method for determining an optimal speed of a first vehicle preceded by a second vehicle. Position, speed and acceleration of the second vehicle are measured in order to determine a trajectory thereof, and a dynamic model of the first vehicle is constructed. The optimal speed is then determined by minimizing the energy consumption of the vehicle by use of the dynamic model by minimization being constrained by the trajectory of the second vehicle.

11 Claims, 4 Drawing Sheets

(51) Int. Cl.
G05D 1/00 (2006.01)
G05D 1/02 (2020.01)
B60W 30/14 (2006.01)
B60W 40/04 (2006.01)
B60W 50/00 (2006.01)
B60K 31/00 (2006.01)

(52) U.S. Cl.
CPC .......... *B60W 30/162* (2013.01); *B60W 40/04* (2013.01); *G05D 1/0088* (2013.01); *G05D 1/0217* (2013.01); *B60K 2031/0025* (2013.01); *B60K 2031/0033* (2013.01); *B60W 2050/0013* (2013.01); *B60W 2050/0026* (2013.01); *B60W 2050/0031* (2013.01); *B60W 2554/4041* (2020.02); *B60W 2554/80* (2020.02); *B60W 2554/801* (2020.02); *B60W 2554/803* (2020.02); *B60W 2554/804* (2020.02); *B60W 2555/60* (2020.02); *B60Y 2300/52* (2013.01); *G05D 2201/0213* (2013.01)

(58) Field of Classification Search
CPC ....... B60W 2554/80; B60W 2554/801; B60W 2554/803; B60W 2554/804; B60W 2554/4041; B60W 2555/60; B60W 2050/0013; B60W 2050/0026; B60W 2050/0031; B60W 2520/10; G05D 1/0088; G05D 1/0217; G05D 2201/0213; B60Y 2300/52; B60K 2031/0025; B60K 2031/0033
See application file for complete search history.

(56) References Cited

U.S. PATENT DOCUMENTS

| 2010/0049400 | A1* | 2/2010 | Duraiswamy | B60W 30/143 701/33.4 |
| 2014/0067247 | A1* | 3/2014 | Chasse | B60W 20/10 701/123 |
| 2017/0031361 | A1* | 2/2017 | Olson | G06K 9/00791 |
| 2018/0246517 | A1* | 8/2018 | Costa | G05D 1/0027 |

OTHER PUBLICATIONS

Kohut, Nicholas; Hedrick, Karl; Borrelli, Francesco, Integrating traffic data and model predictive control to improve fuel economy , 2009, Elsevier, vol. 42, Issue 15, pp. 155-160 (Year: 2009).*

Wikipedia, Equations of Motion, Jun. 8, 2017, Wikipedia, pp. 4-7 (Year: 2017).*

Moebs, William; Ling, Samuel; Sanny, Jeff, University Physics vol. 1, Sep. 19, 2016, OpenStax, pp. 8 and 15 (Year: 2016).*

Md Abdus Samad Kamal et al: "Model Predictive Control of Vehicles on Urban Roads for Improved Fuel Economy", IEEE Transactions on Control Systems Technology, IEEE Service Center, New York, NY, US, vol. 21, No. 3, (May 1, 2013), pp. 831-841, XP011504782.

Sciarretta Antonio et al: Optimal Ecodriving Control: Energy-Efficient Driving of Road Vehicles as an Optimal Control Problem11 , IEEE Control Systems, IEEE, USA, vo 1 • 35 , No. 5 , (Oct. 1, 2015), pp. 71-90, XP011669319.

* cited by examiner

_US 11,345,355 B2_

METHOD FOR DETERMINING A SPEED TO BE REACHED FOR A FIRST VEHICLE PRECEDED BY A SECOND VEHICLE, IN PARTICULAR FOR AN AUTONOMOUS VEHICLE

CROSS REFERENCE TO RELATED APPLICATIONS

Reference is made to French Application No. 17/58.212 filed Sep. 6, 2017, to which priority is claimed and which is incorporated herein by reference in its entirety.

BACKGROUND OF THE INVENTION

Field of the Invention

The present invention relates to vehicle navigation and in particular determining a speed that optimizes the energy consumption, notably for an autonomous vehicle.

Description of the Prior Art

According to the International Energy Agency, more than 50% of the petroleum consumed worldwide is used by the transport sector with more than three quarters being for road transport. Again according to this agency, the transport sector is responsible for around a quarter (23.8%) of greenhouse gas emissions and for more than a quarter (27.9%) of $CO_2$ emissions in Europe in 2006.

It is therefore more important than ever to increase the energy efficiency of road travel in order to reduce the consumption of energy, whether fossil or electrical energy. Thus, Advanced Driver Assistance Systems (ADAS) represents a promising solution, both for economical (the driver's smartphone or an embedded system can simply be used) and non-intrusive (the mechanical components of the vehicle require no modifications) considerations.

Among the driver assistance systems, the applicant has developed a method for determining an eco-driving indicator, notably described in patent FR-2,994,923 corresponding to U.S. Pat. No. 9,286,737. This method is satisfactory, notably because it allows determination of an energy indicator for a portion of a path travelled by a vehicle. However, it is desirable take account more precisely for the traffic conditions, and in particular the behavior of the vehicle preceding the vehicle being considered. Furthermore, it is desirable to determine in real time a predictive energy-optimal speed for an approaching road segment.

Manufacturers are currently developing autonomous vehicles which navigate without human input. Autonomous vehicles need to account for the driving context of the vehicle (for example: traffic, speed limits, etc.) and of security constraints in order to determine the control thereof.

The eco-driving method described in the aforementioned patent FR-2,994,923, corresponding to U.S. Pat. No. 9,286,737, does not allow control of an autonomous vehicle.

Various methods for controlling the speed and the travel of autonomous vehicles have been developed.

For example, U.S. Pat. No. 5,448,479 relates to the speed control of an autonomous vehicle for avoiding collision with a preceding vehicle. However, the control described in this patent does not minimize the energy consumption of the vehicle. This control is therefore not optimal in terms of energy consumption.

SUMMARY OF THE INVENTION

In order to overcome these drawbacks, the present invention relates to a method for determining an optimal speed to be reached for a first vehicle preceded by a second vehicle. For this method, the position, the speed and the acceleration of the second vehicle are measured in order to determine the trajectory thereof and a dynamic model of the first vehicle is constructed. The speed to be reached is then determined by minimizing the energy consumption of the vehicle by use of the dynamic model with the minimization being constrained by the trajectory of the second vehicle. Thus, the method determines a speed that avoids collision with the preceding vehicle while minimizing the energy consumption. Furthermore, the method according to the invention is suited to an autonomous vehicle because the speed is determined in real time and it can therefore be directly applied for control of the first vehicle.

The invention relates to a method for determining a speed to be reached for a first vehicle which is preceded on the road by a second vehicle. For this method, the following steps are carried out:

a) measuring distance, speed and acceleration of the second vehicle preceding the first vehicle;

b) determining a trajectory of a second vehicle by use of the measurements;

c) constructing a dynamic model of the first vehicle that relates energy consumption of the first vehicle to speed of the first vehicle; and d) determining an optimal speed to be reached by the first vehicle by minimizing the energy consumption of the first vehicle, by use of the dynamic model to constrain the trajectory of the second vehicle.

According to an embodiment of the invention, the optimal speed of the first vehicle is determined using a Model Predictive Control (MPC) type approach.

Advantageously, the MPC type approach is implemented over a time horizon determined by taking account of the traffic conditions.

According to an implementation, the energy consumption minimization is constrained by at least one of the traffic conditions, the speed limits and by the infrastructure of the road on which the first vehicle is travelling.

Preferably, at least one of the traffic conditions, speed limits and road infrastructure are obtained in real time through communication with web services.

According to an aspect, the minimization is constrained by a safety distance between the first vehicle and the second vehicle.

According to an embodiment of the invention, the method comprises a step of controlling the first vehicle with the optimal speed.

Advantageously, the first vehicle is an autonomous vehicle.

Alternatively, the method comprises a step of comparing between either the determined optimal speed and the speed reached by the driver of the first vehicle, or between the optimal energy determined by use of the optimal speed and the energy consumption of the first vehicle, and a step of determining an eco-driving indicator by use of the comparison.

According to an implementation of the invention, the optimal energy is determined by minimizing a function J, of the form $J = \int_0^T P_{source}(u,v)dt$, with $P_{source}$ being the engine power output of the first vehicle, u being the torque delivered by the engine of the first vehicle and v being the speed of the first vehicle.

According to a feature, the dynamic model of the first vehicle is written in the form: $m\dot{v} = F_t - F_a - F_r - F_g - F_b$, with m being the mass of the first vehicle, $F_t$ being the traction force, $F_a$ being the aerodynamic force, $F_r$ being the rolling resistance force, $F_g$ being the gravitational force and $F_b$ being the mechanical braking force.

According to an aspect, the dynamic model of the vehicle depends on intrinsic parameters of the vehicle.

Advantageously, the intrinsic parameters of the vehicle are obtained from a database or are transmitted by a user.

According to an embodiment, the trajectory of the second vehicle is determined by determining the position thereof by use of an equation of the type: $s_{Leader} = s + \Delta s + v_{Leader} t + \frac{1}{2} a_{Leader} t^2$, with $s_{Leader}$ being a position of the second vehicle, s being the position of the first vehicle, $\Delta s$ being distance between the first vehicle and the second vehicle, t being time, $v_{Leader}$ being the speed of the second vehicle and $a_{Leader}$ being acceleration of the second vehicle.

Moreover, the invention relates to a computer program product which is at least one of downloadable from a communication network, recorded on a computer-readable medium and processor or server, comprising program code instructions for implementing the method according to one of the above features, when the program is executed on a computer or on a mobile phone.

BRIEF DESCRIPTION OF THE DRAWINGS

Other features and advantages of the method according to the invention will be clear from reading the description hereafter of embodiments given by way of non-limiting examples, with reference to the accompanying figures wherein.

DETAILED DESCRIPTION OF THE INVENTION

Figure 1:
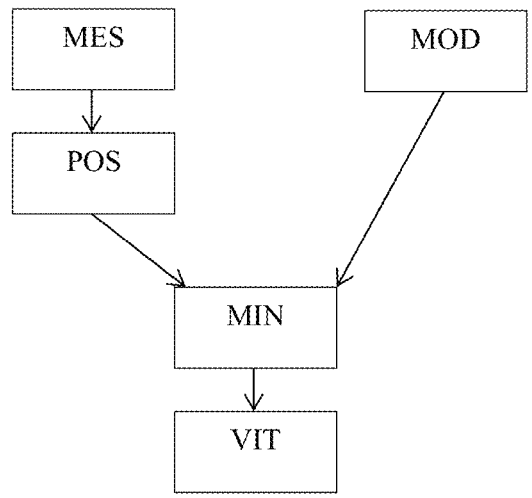
FIG. 1 illustrates steps of the method according to a first embodiment of the invention.

The present invention relates to a method for determining an optimal speed to be reached for a first vehicle which is preceded on the road by a second vehicle. The first vehicle is the vehicle being considered for which the optimal speed to be reached is determined.

The method according to the invention is suited to any type of vehicle: combustion vehicles, hybrid vehicles, electric vehicles, etc. Furthermore, the vehicle can be an autonomous vehicle or not.

Notations

The following notations are used in the description hereafter:

| | | |
|---|---|---|
| v | Speed of the first vehicle | [m/s] |
| s | Position of the first vehicle | [m] |
| m | Mass of the first vehicle | [kg] |
| $\omega_m$ | Engine speed of the first vehicle | [rps] |
| $F_t$ | Vehicle traction force on the wheel | [N] |
| $F_a$ | Aerodynamic force on the vehicle | [N] |
| $F_r$ | Friction force undergone by the vehicle | [N] |
| $F_g$ | Normal force undergone by the vehicle (gravity) | [N] |
| $F_b$ | Mechanical braking force | [N] |
| $\alpha$ | Angle of inclination of the road | [rad] |
| $\rho_a$ | Air density | [kg/m$^3$] |
| $A_f$ | Frontal area of the vehicle | [m$^2$] |
| $c_d$ | Aerodynamic drag coefficient | [—] |
| $c_r$ | Rolling resistance coefficient | [—] |
| g | Gravitational acceleration | [m/s$^2$] |
| r | Wheel radius | [m] |
| $R_t$ | Vehicle transmission ratio | [—] |
| $\eta_t$ | Vehicle transmission efficiency | [—] |
| $T_m$ | Engine torque | [Nm] |
| $P_{source}$ | Engine power of the first vehicle | [W] |
| U | Engine torque of the first vehicle | [Nm] |
| $S_{Leader}$ | Position of the second vehicle | [m] |
| $\Delta s$ | Distance between the first vehicle and the second vehicle | [m] |
| $v_{Leader}$ | Speed of the second vehicle | [m/s] |
| $a_{Leader}$ | Acceleration of the second vehicle | [m/s$^2$] |
| t | Time | [s] |
| $T_c$ | Control step | [s] |
| T | Prediction horizon and optimization (time until next stopping point hypothesis that can be based on traffic and map information) | [s] |
| n | Number of control steps | [—] |
| $\Delta$ | Control horizon | [s] |
| $V_a$ | Voltage of the electric machine | [V] |
| $i_a$ | Current of the electric machine | [A] |
| $R_a$ | Resistance of the electric machine | [Ohm] |
| k | Speed constant of the electric machine | [—] |
| $t_0$ | Current time at the start of a new optimization | [s] |
| $s_f$ | Position of the first vehicle at time T (equal to the length of the road until the next stopping point) | [m] |
| $v_0$ | Speed of the first vehicle at time $t_0$ (measured) | [m/s] |
| $v_f$ | Speed of the first vehicle at time T (prediction based on traffic and map information) | [m/s] |

For these notations, the time derivative is denoted by $$\frac{d}{dt}$$

or by a dot above the variable considered.

The method according to the invention comprises the following steps:

1) measuring distance, speed and acceleration of the second vehicle;

2) determining a trajectory of the second vehicle;

3) constructing a dynamic model of the first vehicle; and 4) determining an optimal speed of the first vehicle.

The steps of constructing the dynamic model of the vehicle on one hand and of measuring and determining the trajectory of the second vehicle on the other hand can be carried out in this order, simultaneously or in the reverse order.

The method according to the invention is preferably carried out in real time.

Thus, the method according to the invention allows real-time determination of the optimal speed. The determined optimal speed can therefore be directly applied to the vehicle.

FIG. 1 schematically illustrates, by way of non-limitative example, the steps of the method according to a first embodiment of the invention:

1) measuring the distance, speed and acceleration of the second vehicle (MES);
2) determining the trajectory of the second vehicle (POS) by use of measurements (MES);
3) constructing a dynamic model (MOD) of the first vehicle; and
4) determining the optimal speed (VIT) of the first vehicle by minimizing energy consumption of the first vehicle determined by use of dynamic model (MOD) with the minimization being constrained by the trajectory (POS) of the second vehicle.

According to a second embodiment of the invention, the method can comprise an additional step of controlling the first vehicle on a basis of the determined optimal speed. This control applies the optimal speed (VIT) determined to the first vehicle.

Figure 2:
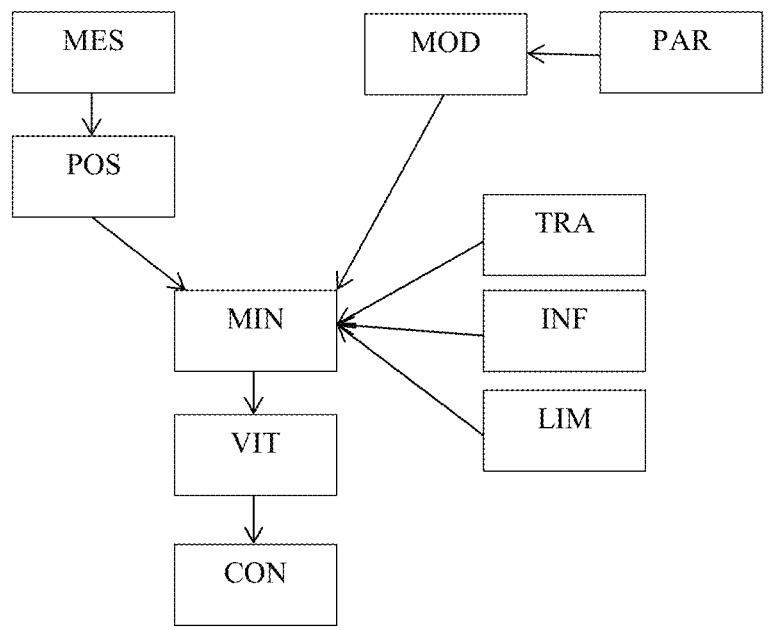
FIG. 2 illustrates steps of the method according to a second embodiment of the invention.

FIG. 2 schematically illustrates, by way of non-limitative example, the steps of the method according to the second embodiment of the invention. In addition to the steps described in connection with FIG. 1, the method comprises the following optional steps:

determining the road traffic (TRA), with the traffic determination being used for determining the optimal speed by minimizing the energy consumption (MIN);
determining the road infrastructures (INF) with the road infrastructure determination being used for determining the optimal speed by minimizing the energy consumption (MIN);
determining the speed limits (LIM) with the speed limit determination being used for determining the optimal speed by minimizing the energy consumption (MIN);
determining the intrinsic parameters of the vehicle (PAR) with these parameters being used for construction of the dynamic model (MOD); and
controlling the first vehicle (CON) with this control applying the optimal speed (VIT) determined to the first vehicle.

The steps of determining the road traffic (TRA), the road infrastructures (INF), the speed limits (LIM) and the intrinsic parameters of the vehicle (PAR) are independent. It is therefore possible to carry out only part of these steps. Furthermore, these steps are not related to the first vehicle control step (CON). In other words, the first vehicle control step (CON) can be carried out without or with all or part of these steps (TRA, INF, LIM, PAR). These steps (TRA, INF, LIM, PAR) can be added to the embodiment illustrated in FIG. 1.

According to a third embodiment of the invention, the method can comprise an additional step of comparing either the optimal speed determined with the speed achieved by the user, or the real energy consumption with the optimal energy consumption determined from the optimal speed. Then an additional step of determining an energy indicator (referred to as eco-driving indicator) obtained by use of the comparison can be employed. This indicator can be displayed for the driver.

Figure 3:
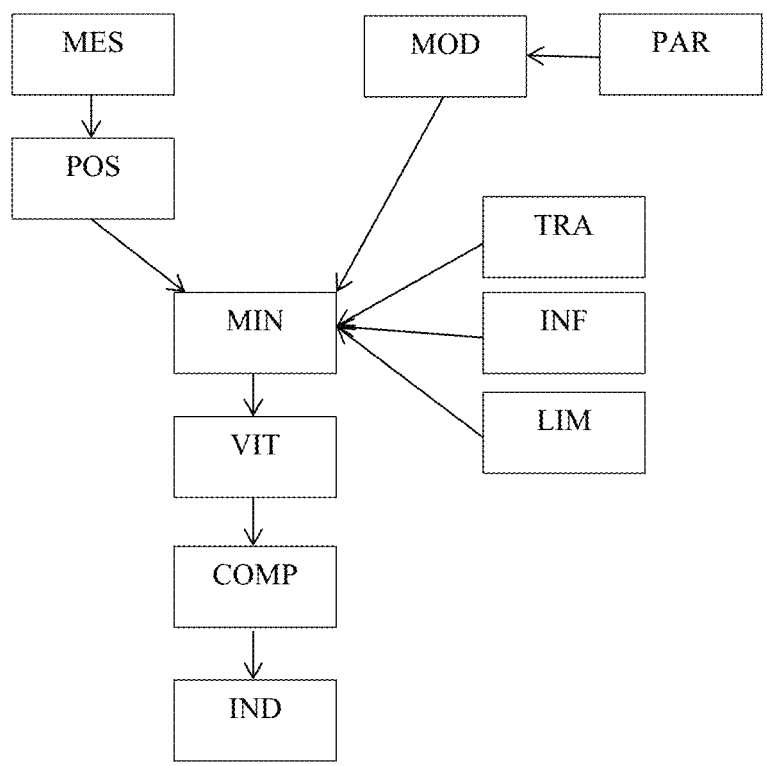
FIG. 3 illustrates steps of the method according to a third embodiment of the invention.

FIG. 3 schematically illustrates, by way of non-limitative example, the steps of the method according to the third embodiment of the invention. In addition to the steps described in connection with FIG. 1, the method comprises the following optional steps:

determining the road traffic (TRA) which can be used for determining the optimal speed by minimizing the energy consumption (MIN);
determining the road infrastructures (INF) which road infrastructures determination can be used for determining the optimal speed by minimizing the energy consumption (MIN);
determining the speed limits (LIM) which speed limit determination can be used for determining the optimal speed by minimizing the energy consumption (MIN);
determining the intrinsic parameters of the vehicle (PAR) which these parameters can be used for construction of the dynamic model (MOD);
comparing the optimal speed (VIT) determined with an achieved speed (COMP) or comparing the optimal energy related to the optimal speed (VIT) with the real energy consumption; and
determining an eco-driving indicator (IND) based on the comparison (COMP).

The steps of determining the road traffic (TRA), the road infrastructures (INF), the speed limits (LIM) and the intrinsic parameters of the vehicle (PAR) are independent. It is therefore possible to carry out only part of these steps. Furthermore, these steps are not related to the comparison (COMP) and indicator (IND) determination steps. In other words, the comparison (COMP) and indicator (IND) determination steps can be carried out without or with all or part of these steps (TRA, INF, LIM, PAR), and these steps (TRA, INF, LIM, PAR) can be added to the embodiment illustrated in FIG. 1.

All the steps of the method, including their variants shown in FIGS. 2 and 3, are described below.

1) Measuring the Distance, Speed and Acceleration of the Second Vehicle (MES)

In this step, the following measurements are performed in real time:
the distance between the first vehicle and the second vehicle,
the speed of the second vehicle, and
the acceleration of the second vehicle.

According to an implementation of the invention, these measurements can be performed with at least one sensor installed in the first vehicle. The sensor can be a camera, a radar, a lidar, etc. These sensors may be redundant, notably in an autonomous vehicle, in order to improve safety.

According to another implementation of the invention, the position and the distance can be obtained by use of at least one sensor, and the speed and the acceleration can be calculated from the position and the distance.

2) Determining the Trajectory of the Second Vehicle (POS)

In this step, the trajectory of the second vehicle is determined in real time by use of the measurements performed in the previous step. In other words, the position of the second vehicle on the road is determined.

According to an embodiment of the invention, the trajectory of the second vehicle can be determined by use of an equation of the type: $s_{Leader} = s + \Delta s + v_{Leader} t + \frac{1}{2} a_{Leader} t^2$, with $s_{Leader}$ being the position of the second vehicle, s being the position of the first vehicle, $\Delta s$ being the distance between the first vehicle and the second vehicle, t being time, $v_{Leader}$ being the measured speed of the second vehicle and $a_{Leader}$ being the measured acceleration of the second vehicle.

For the method according to the invention, the position s of the first vehicle can be measured, notably by use of a geolocation system (GPS). Furthermore, the speed of the first vehicle can be measured, notably by use of a geolocation system (GPS).

3) Constructing the Dynamic Model of the First Vehicle (MOD)

In this step, a dynamic model of the first vehicle is constructed. What is referred to as dynamic model of the vehicle is a model connecting the energy consumption of the vehicle to the speed and acceleration of the vehicle. The dynamic model of the vehicle can be constructed using the fundamental principle of dynamics, associated with an engine energy model.

According to an implementation of the invention (see the step of determining the intrinsic parameters of the vehicle of FIG. 2), the model can be constructed from macroscopic parameters of the vehicle, for example: vehicle engine power, vehicle mass, maximum power, maximum speed, transmission type, aerodynamic parameters, etc. Thus, the dynamic model is representative of the vehicle and accounts for of its specific characteristics.

According to a variant embodiment, the macroscopic parameters can be obtained from a database that lists the various vehicles in service. For example, the macroscopic parameters can be obtained by entering the registration number of the vehicle, the database associating the plate number with the design thereof (make, model, engine power, etc.) and comprising the macroscopic parameters of the vehicle.

Alternatively, the macroscopic parameters can be manufacturer data provided by the user, in particular using an interface (a smartphone, the dashboard or a geolocation system for example).

The dynamic model of the vehicle can also depend on road parameters such as the slope of the road. Such data can be obtained from a topology or a map of the road network.

In the absence of transmission loss and wheel slip, the transmission model can be written as follows:

$$F_t = \frac{T_m \eta_t^{sign(T_m)} R_t}{r}, \quad \omega_m = \frac{v R_t}{r}$$

where $F_t$ is the traction force, $R_t$ and $\eta_t$ are the transmission ratio and the transmission efficiency respectively, $T_m$ is the engine torque (electric motor, combustion or hybrid engine combining both systems), v is the longitudinal speed, r is the wheel radius and $\omega_m$ is the engine speed.

From Newton's third law (i.e. the fundamental principle of dynamics), the longitudinal dynamic model of the vehicle can be expressed using resistive forces (aerodynamic $F_a$, friction $F_r$ and gravity $F_g$) and the mechanical braking force $F_b$ as follows:

$$\dot{s} = v$$

$$m\dot{v} = F_r - F_a - f_r - F_g - F_b$$

$$m\dot{v} = \frac{R_t}{r} T_m \eta_t^{sign(T_m)} - \frac{1}{2}\rho_a A_f c_d v^2 - mgc_r - mg\sin(\alpha(s)) - F_b$$

where m is the mass of the vehicle, $\rho_a$ is the density of the air, $A_f$ is the frontal area of the vehicle, $c_d$ is the aerodynamic drag coefficient, $c_r$ is the rolling resistance coefficient, $\alpha(s)$ is the slope of the road as a function of the position and g is the acceleration of gravity. The control variable is defined as the requested engine torque $u=T_m$.

4) Determining the Optimal Speed (MIN, VIT)

In this step, the optimal speed of the first vehicle is determined in real time and in a predictive manner. The optimal speed provides:
- minimizing the energy consumption, and
- accounting for the trajectory of the second vehicle.

Thus, the method according to the invention minimizes the energy consumption while accounting for the traffic conditions and preventing risks of collision with the second vehicle.

Determining the optimal speed can therefore be done with a minimization method constrained by the trajectory of the second vehicle.

According to an implementation of the invention, the minimization method can be further constrained by at least one of the following conditions:
- the speed limits of the road on which the first vehicle (and a fortiori the second vehicle) is travelling;
- the traffic conditions; and
- the road infrastructure, which is the type of road (urban road, highway, etc.) and traffic regulation (roundabout, intersection, traffic lights, etc.).

Taking account of these conditions permits determining an optimal speed that really corresponds to the path of the vehicle and allows improvement of the safety aspect obtained with the optimal speed.

Advantageously, the information relative to the speed limits, the traffic conditions and the road infrastructure can be obtained in real time through communication with web services.

Furthermore, the minimization method can be constrained by a safety distance between the first vehicle and the second vehicle. This safety distance can be dependent on the speed, the road infrastructure, the traffic conditions. This constraint also allows improving the safety aspect obtained with the optimal speed by preventing risk of collision with the second vehicle.

According to an embodiment of the invention, the minimization method used is a Model Predictive Control (MPC) type approach. The principle of this technique is to use a dynamic model of the process within the controller in real time in order to anticipate the future behavior of the process. This predictive control method can be referred to as MPC Model Based Predictive Control (MBPC).

The space and time horizons can therefore be divided into n control steps Tc. At each step, an optimal control is updated and applied according to the new measurements of the second vehicle. The space horizon can be calculated between the current position of the vehicle and the next stopping point. The time horizon can be recovered via a web service that accounts for the traffic conditions.

The next stopping point is the next infrastructure-related obstacle that will compel slow down. It can be estimated from a web map service (it may be the next intersection, traffic light or pedestrian crossing for example). This information can be strengthened by a camera type sensor or through communication with the infrastructure.

The efficiency of predictive control systems is linked with the nature of the prediction models used or with the value of the control horizon. The more precise the prediction or the smaller the horizon, the more reliable the solution. The present invention uses a simple prediction model that might degrade the optimization quality. However, given that the time required for computing the solution at each step is negligible, since it is analytical, the control horizon can be sufficiently short in order to guarantee near-optimal performance.

According to an embodiment of the invention, for this optimization problem, the procedure described below can be carried out.

The energy consumption can be deduced from the power, which is a function of torque u and of speed v of the first vehicle:

$$P_{source} = g(u,v)$$

The constraints of the problem can be given by the speed limits and the trajectory predicted for the second vehicle (determined in Stage 2).

The optimal energy can be determined by minimizing a function J of the type:

$$\min_u J = \int_0^T P_{source}(u,v) dt,$$

subject to:

$$\dot{x} = f(x, u, t)$$
$$h(x, t) \leq 0$$
$$u \in U, x \in X$$
$$s(t_0) = 0, s(T) = s_f$$
$$v(t_0) = v_0, v(T) = v_f$$

with:

$$u = [T_m, F_b]$$
$$x = [s, v]$$
$$f = \left[v, h_1 T_m \eta_{lt}^{sign(T_m)} - h_2 v^2 - h_0 - F_b\right]$$
$$h^{(p)} = [s - s_{Leader}, v - v_{max}]$$

and:

$$h_1 = \frac{R_t}{rm},$$
$$h_2 = \frac{1}{2m}\rho_a A_f c_d$$
$$h_0 = gc_r + g\sin(\alpha(s)).$$

To solve the problem presented above, two methods are generally used, the direct adjoint method and the indirect adjoint method. For this embodiment of the invention, the indirect method can be applied as follows.

Given the presence of constraints, it can be defined as:

$$H(u,x,\lambda,t) = P_{source}(u,v) + \lambda^T f(u,x,t)$$

$$L(u,x,\lambda,t) = H(u,x,\lambda,t) + \eta^T h^{(p)}(u,x)$$

where p is the order of the state constraint, defined as the number of successive differentiations of h until explicit appearance of the control.

The optimality conditions can be:

$$u^*(t) = \operatorname{argmin}_u H(u^*, x^*, \lambda^*, t),$$

$$\dot{x}^*(t) = \partial L(u^*, x^*, \lambda^*, \eta^*, t)/\partial \lambda,$$

$$\dot{\lambda}^*(t) = \partial L(u^*, x^*, \lambda^*, \eta^*, t)/\partial x,$$

$$\eta^*(t) \cdot h^{(p)}(u^*, x^*, t) = 0, \eta^*(t) \geq 0$$

Due to the presence of possible jumps in the solution, the junction times can satisfy:

$$\Psi(x,t) = \begin{bmatrix} h^{(0)}(x,t) \\ h^{(1)}(x,t) \\ \vdots \\ h^{(p-1)}(x,t) \end{bmatrix}$$

$$\lambda^*(\tau^-)^T = \lambda^*(\tau^+)^T + \sum_{j=0}^{p-1} \eta_j \cdot h_{x^*}^{(j)}(x^*, \tau),$$

$$H^o(\tau^-) - H^o(\tau^+) - \sum_{j=0}^{p-1} \eta_j \cdot h_t^{(j)}(x^*, \tau),$$

where $\tau$ is the solution jump time and $\eta_j$ are the components of the Lagrangian multiplier $\eta$.

The sets of equations described above allow an analytical solution to be found to the formulated problem.

Thus, an energy-optimal speed is determined in real time while taking account of the behavior of the second vehicle and while maintaining a high safety level.

5) Controlling the First Vehicle

This is an optional step corresponding to the second embodiment of the invention illustrated in FIG. 2.

In this step, the first vehicle is controlled in real time as a function of the optimal speed determined in step 4. In other words, the optimal speed determined is applied to the first vehicle. This optimal speed allows minimizing the energy consumption of the first vehicle while providing high safety conditions.

The powertrain of the first vehicle can therefore be controlled. It may notably be a combustion engine, an electric machine or a hybrid system.

This embodiment is particularly suited for an autonomous vehicle.

5') Comparing the Optimal Speed Determined with the Speed Achieved (COMP)

This is an optional step corresponding to the first additional step of the third embodiment of the invention illustrated in FIG. 3.

This step is carried out at the end of a road portion on which the first vehicle has travelled. In this step, the optimal speed determined in step 4 is compared with the speed achieved (measured) by the vehicle.

Alternatively, in this step, the optimal energy consumption related to the optimal speed can be compared with the real energy consumption of the first vehicle.

6') Determining an Eco-Driving Indicator (IND)

This is an optional step corresponding to the second additional step of the third embodiment of the invention illustrated in FIG. 3.

In this step, at least one eco-driving indicator is determined by use of the comparison performed in step 5'.

According to an aspect of the invention, the eco-driving indicator can be the difference between the real energy consumption of the first vehicle and the energy corresponding to the optimal speed determined.

Alternatively, the eco-driving indicator can be a ratio between the energy consumption of the first vehicle and the energy consumption corresponding to the determined optimal speed.

Once the energy indicator(s) is determined, this information can be transmitted to the driver by a display. It can be displayed on-board the vehicle: on the dashboard, on an autonomous mobile device such as a geolocation system (of GPS type), a mobile phone (of smartphone type). It is also possible to display this indicator on a website that the driver can consult later, when they are no longer behind the wheel.

The method according to the invention can be used for motorcars. It can however be used in the field of road transport, two-wheelers, etc.

Furthermore, the invention relates to a computer program product which is at least one of downloadable from a communication network, recorded on a tangible computer-readable medium, a processor or executable with a server. This program comprises program code instructions for implementing the method as described above, when the program is executed on a computer or on a mobile phone or any similar system.

Application Examples

The features and advantages of the method according to the invention will be clear from reading the application examples hereafter.

For the two application examples, the case of an electric vehicle (for the first vehicle) is studied in order to illustrate the application of the invention to a given example.

In view of the regenerative braking of the electric vehicle, it can be assumed that the mechanical brake is not used ($F_b=0$), therefore $u=T_m$ in this case. A static model of the electrical machine DC is used to describe the source of power, which corresponds to the electrical power of the motor, $P_m$ in this case.

$$P_{source} = P_m = V_a i_a = \omega_m u + \frac{R_a}{k^2} T_m^2 = b_1 uv + b_2 u^2$$

where $V_a$, $i_a$ and $R_a$ are the voltage, the current and the resistance respectively. k is the speed constant and $\omega_m$ is the rotational speed of the motor. It can be noted that $$V_a = i_a R_a + k\omega_m \text{ and } i_a = \frac{T_m}{k}.$$

For the two examples below, the vehicle defined in Table 1 is considered:

TABLE 1

Parameters of the vehicle

| Description | Parameter | Value |
| --- | --- | --- |
| Mass of the vehicle | m | 1432 kg |
| Wheel radius | r | 0.2820 m |
| Transmission ratio | $R_t$ | 9.5900 |
| Efficiency | $\eta_t$ | 0.98 |
| Coefficient of the static model of the electric machine | $b_1$ | 34.01 |
| Coefficient of the static model of the electric machine | $b_2$ | 0.873 |
| Coefficient | $h_0$ | 185.43 |
| Coefficient | $h_2$ | 0.2996 |

The first case study corresponds to a simulation study performed using software modelling urban traffic at microscopic scale. This software notably allows simulation of the behavior of a vehicle that is not optimized by the present invention in order to estimate the gains.

The scenario corresponds to two vehicles moving between a point A and a point B, passing through a roundabout and a traffic light, infrastructure disturbances a priori unknown by the method for determining a speed to be reached according to the present invention. The purpose of this test case is to measure the performances of the invention under real-life conditions. The second vehicle moves according to a Gipps profile (Gipps' model is a car-following model based on the driver's behavior and on the expectancy for vehicles in a stream of traffic).

Figure 4:
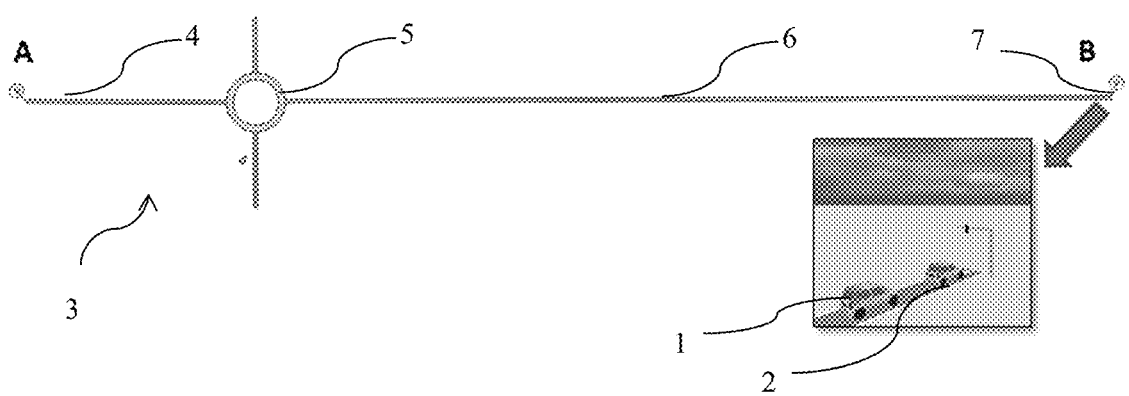
FIG. 4 illustrates a road portion used for the first application example.

FIG. 4 schematically illustrates the motion of the two vehicles between point A and point B. On this road 3, a first vehicle 1 follows a second vehicle 2. Road 3 comprises a first road segment 4 between point A and a roundabout 5, roundabout 5, a second road segment 6 between roundabout 5 and a traffic light 7 located at point B.

For this first example, the simulation parameters are defined in Table 2:

TABLE 2

Driving and simulation parameters

| | Parameter | Value |
| --- | --- | --- |
| Total distance | D | 1000 m |
| Total duration | T | 80 s |
| Initial inter-distance | d | 100 m |
| Maximum speed | $V_{max}$ | 50 km/h |
| Initial speed | $v_o$ | 0 km/h |
| Final speed | v | 50 km/h |
| Control horizon | $T_c$ | 0.1 s |

The invention is compared with two other approaches in order to assess the performances thereof:

1—an optimal solution found via the penalty method (BVP). This optimal solution allows quantification of the gain potential but it requires perfect knowledge of the trajectory of the second vehicle a priori, which is not realistic;

2—a non-eco-driving standard profile which is a reference solution without energy optimization calculated via Gipps' model.

In all cases, the first vehicle catches up with the second vehicle, to within the inter-distance between the two vehicles, at the end of the road segment.

Figure 5:
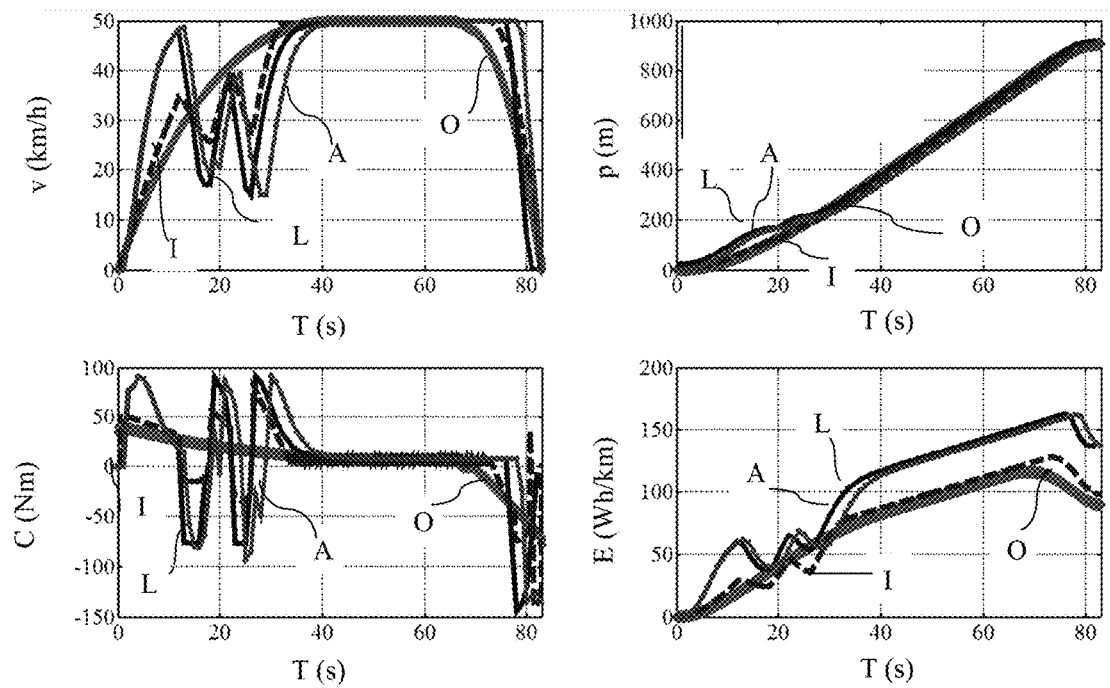
FIG. 5 illustrates the curves relative to the speed, position, engine torque and energy consumption for an optimal energy-efficient solution, for the vehicle preceding the vehicle being considered, for a method according to prior art, and for a method according to the invention, within the context of a first example.

FIG. 5 illustrates several curves relative to the speed of the first vehicle v (km/h), the position of the first vehicle p (m), the engine torque of the first vehicle C (Nm) and the energy consumption E normalized by the distance (Wh/km) travelled by the first vehicle. In these curves, the values of the second vehicle are denoted by L, the values obtained with the optimal solution BVP of the prior art are denoted by O, the values obtained by the non-eco-driving Gipps type standard profile of the prior art are denoted by A, and the values obtained with the method according to the invention are denoted by I and illustrated by dotted lines.

It is interesting to observe the behavior of the method according to the invention in case of a disturbance in the driving of the second vehicle. The upper right figure shows that the eco-driving vehicle according to the invention I arrives at the roundabout (16 s) at a lower speed in relation to eco-driving profile A, which makes the acceleration and the deceleration phases less marked. Between 40 s and 70 s, all the vehicles behave identically, whereas when they approach the traffic light, the eco-driving vehicle according to the invention I provides better deceleration in contrast with the non-eco driving vehicle according to the prior art A. The upper right figure shows that the constraint imposed by the trajectory of the second vehicle is respected by the eco-driving vehicle according to the invention I, whereas the bottom left figure shows a better torque limitation with the eco-driving vehicle according to the invention I. Finally, the bottom right figure illustrates the energy gains that are normalized by the travelled distance. In relation to the non-eco-driving vehicle according to the prior art A, the invention allows reaching a 31% energy gain. This significant gain results from the optimization achieved by the present invention. Furthermore, it is interesting to specify that the energy consumption obtained according to the invention I is very close to the optimal value O, although the present invention has no a priori knowledge of all the possible disturbances as the BVP approach.

Figure 6:
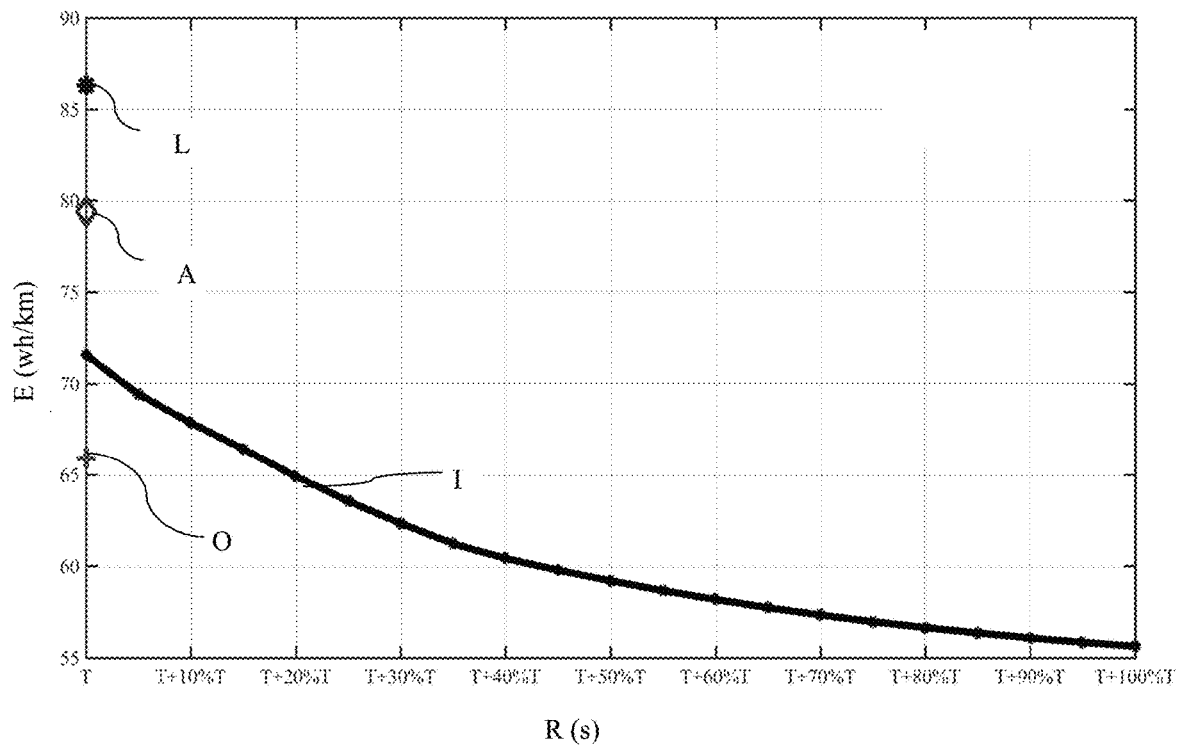
FIG. 6 illustrates a curve between energy consumption and arrival time within the context of the first example.
Figure 7:
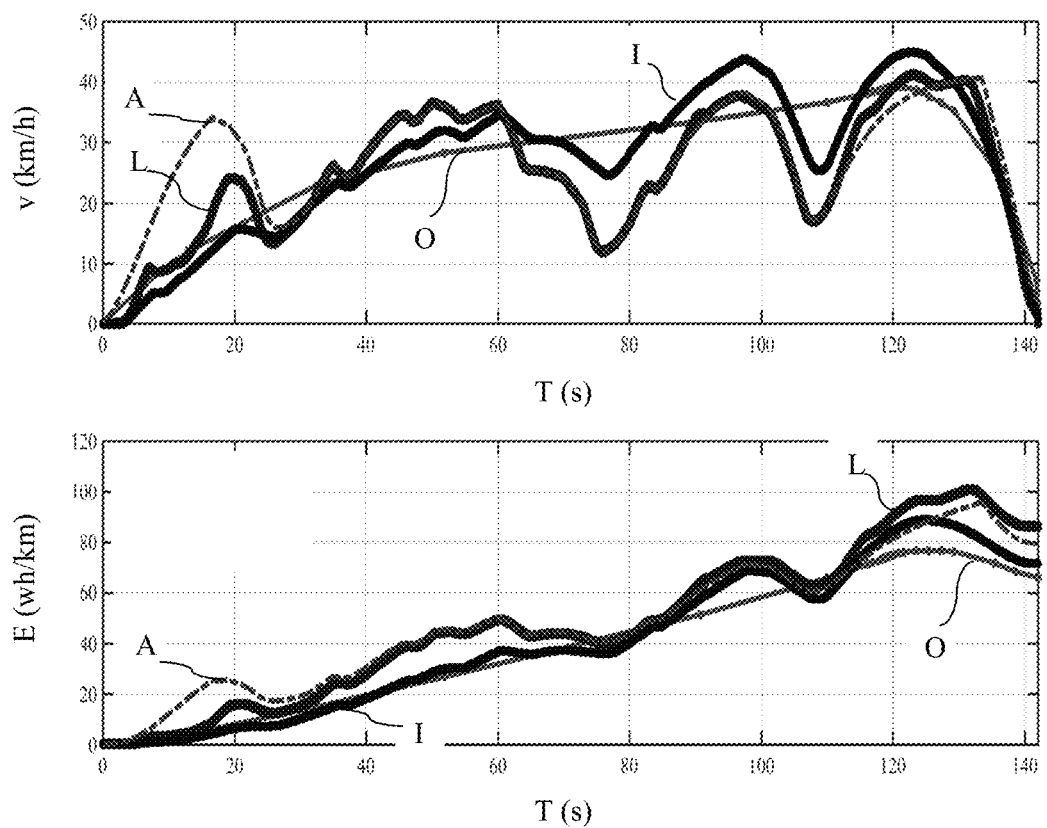
FIG. 7 illustrates curves relative to speed and the energy consumption for an optimal energy-efficient solution, for the vehicle preceding the vehicle being considered, for a method according to the prior art, and for a method according to the invention, within the context of a second example.

As mentioned in the advantages, the invention allows settling the compromise between travel time and energy consumption. This compromise is illustrated in FIG. 6. The points of the curve located on the origin of the abscissas represent the case of FIG. 5. In these curves, the values of the second vehicle are denoted by L, the values obtained by the optimal solution BVP of the prior art are denoted by O, the values obtained by the non-eco-driving standard profile according to the prior art are denoted by A, and the values obtained by the method according to the invention are denoted by I which are illustrated by a black solid line.

As expected, when the first vehicle moves more slowly, it gains energy. For example, when allowing it to arrive 10% later (8 s later than the second vehicle), 5% of the gain is obtained.

The second application example corresponds to real driving on a major road. This speed profile is used as the profile followed by the second vehicle. The purpose is to illustrate the response of the invention when the acceleration of the second vehicle varies in order to test the hypothesis of constant acceleration of the second vehicle.

For this second example, the simulation parameters are defined in Table 3:

TABLE 3

Driving and simulation parameters

| Parameter | | Value |
|---|---|---|
| Total distance | D | 1073 m |
| Total duration | T | 142 s |
| Initial inter-distance | d | 75 m |
| Maximum speed | $V_{max}$ | 50 km/h |
| Initial speed | $v_o$ | 0 km/h |
| Final speed | $v_f$ | 0 km/h |
| Control horizon | $T_c$ | 0.1 s |

The prediction horizon (average time required for travelling the road segment considered) is provided by a web map service.

FIG. 6 illustrates several curves relative to the speed of the first vehicle v (km/h) and to the energy consumption E (Wh/km) normalized by the distance travelled by the first vehicle. In these curves, the values of the second vehicle are denoted by L, the values obtained with the optimal solution BVP of the prior art are denoted by O, the values obtained by the non-eco-driving Gipps type standard profile of the prior art are denoted by A, and the values obtained with the method according to the invention are denoted by I and illustrated by a black solid line.

In the top figure, it can be observed that the second vehicle L follows an acceleration profile with high dynamics likely to decrease the potential energy consumption gains by reducing the degree of freedom of the first vehicle. However, the proposed approach I filters some of these dynamics, in particular in the acceleration and deceleration phases. Nevertheless, between 70 s and 130 s, the method according to the invention I provides comparable dynamics to those of the second vehicle L. This is due to the lack of visibility on the future behavior of the second vehicle L. When studying the optimal profile O, a result that seems like an eco-driving result filtering where the acceleration variabilities are eliminated is observed. As for the Gipps approach, according to the prior art, a strong acceleration phase is observed until the point where it follows the profile of the second vehicle.

The bottom figure shows interesting energy-related results. As expected, the BVP approach O provides the best solution, followed by the approach according to the invention I, then the Gipps approach A according to the prior art, and finally the energy of the second vehicle. Table 4 shows the energy losses in relation to the BVP approach.

TABLE 4

Results in terms of energy gain

| Solution | Energy consumption Wh/km | % in relation to BVP |
|---|---|---|
| Gipps | 79.37 | 20.43 |
| Method according to the invention | 71.56 | 8.60 |
| BVP | 65.90 | — |

Thus, the method according to the invention allows determining a speed to be reached for the first vehicle that minimizes the energy consumption (which is not the case with the Gipps approach), while taking into account the behavior of the preceding vehicle (which is not the case with the BVP approach) and while avoiding collision risks.

The invention claimed is:

1. A method for determining a speed to be reached by a first vehicle with the first vehicle being preceded on a road by a second vehicle while minimizing energy consumption of the first vehicle during operation of the first vehicle on the road at an optimal speed, the method being implemented on a computer or on a mobile phone, comprising:
   a) measuring distance, speed, and acceleration of the second vehicle preceding the first vehicle with at least one sensor installed on the first vehicle;
   b) determining a trajectory of the second vehicle by using the measured distance, speed and acceleration of the second vehicle with the trajectory of the second vehicle being determined from position of the second vehicle which is obtained by use of an equation $s_{Leader} = s + \Delta s + v_{Leader} t + \frac{1}{2} a_{Leader} t^2$, with $s_{Leader}$ being the measured position of the second vehicle, s being position of the first vehicle, $\Delta s$ being the distance between the first vehicle and the second vehicle, t being time, $v_{Leader}$ being the measured speed of the second vehicle and $a_{Leader}$ being the measured acceleration of the second vehicle;
   c) constructing a dynamic model of the first vehicle that in real time relates energy consumption of the first vehicle to speed of the first vehicle;
   d) determining in real time an optimal speed to be reached by the first vehicle by minimizing the energy consumption of the first vehicle by using the dynamic model constraining the trajectory of the second vehicle, wherein the optimal speed of the first vehicle is determined using a real time Model Predictive Control (MPC), which is implemented over a time horizon and a space horizon determined by accounting for traffic conditions on the road, and the minimizing of the energy consumption of the first vehicle is constrained by the traffic conditions, the speed limit and the infrastructure of the road on which the vehicles are travelling, the space horizon being calculated between a current position of the first vehicle and a next stopping point which is a next infrastructure related obstacle that compels the first vehicle slowing down; and e) minimizing the energy consumption of the first vehicle by operating the first vehicle with the trajectory of the second vehicle on the road at the optimal speed.

2. A method as claimed in claim 1, wherein at least one of traffic conditions, speed limits and infrastructure of the road are obtained in real time through communication with web services.

3. A method as claimed in claim 1, wherein the minimization of energy consumption is constrained by a safety distance between the first vehicle and the second vehicle.

4. A method as claimed in claim 1, comprising controlling the first vehicle with the optimal speed.

5. A method as claimed in claim 4, wherein the first vehicle is an autonomous vehicle.

6. A method as claimed in claim 1, comprising performing a comparison between either the optimal determined speed and a speed reached by the driver of the first vehicle, or between the determined optimal energy determined by use of the optimal speed and the energy consumption of the first vehicle and determining an eco-driving indicator by use of the comparison.

7. A method as claimed in claim 1, wherein the optimal energy J is determined by minimizing a function expressed as $J=\int_0^T P_{source}(u,v)dt$, with $P_{source}$ being engine power output of the first vehicle, u being torque delivered by an engine of the first vehicle and v being the speed of the first vehicle.

8. A method as claimed in claim 1, wherein the dynamic model of the first vehicle is expressed by a relationship $m\dot{v}=F_t-F_a-F_r-F_g-F_b$, with m being the mass of the first vehicle, $F_t$ being traction force, $F_a$ being aerodynamic force, $F_r$ being rolling resistance force, $F_g$ being gravitational force and $F_b$ being mechanical braking force.

9. A method as claimed in claim 1, wherein the dynamic model of the vehicle is dependent on intrinsic parameters of the vehicle.

10. A method as claimed in claim 9, wherein the intrinsic parameters of the vehicle are obtained from a database or are transmitted by a user.

11. A computer program product including a non-transient recording on a tangible computer-readable medium comprising program code instructions for implementing a method as claimed in claim 1, when the program is executed on a computer or on a mobile phone.

* * * * *